United States Patent [19]

DeLuca et al.

[11] Patent Number: 5,051,993
[45] Date of Patent: Sep. 24, 1991

[54] MIXED MODULATION LEVEL COMMUNICATION SYSTEM

[75] Inventors: Michael J. DeLuca, Boca Raton; David F. Willard, Plantation; Robert J. Schwendeman, Pompano Beach, all of Fla.

[73] Assignee: Motorola, Inc., Schaumburg, Ill.

[21] Appl. No.: 330,837

[22] Filed: Mar. 30, 1989

[51] Int. Cl.$^5$ ............................ H04J 3/04; G08B 5/22
[52] U.S. Cl. ...................................... 370/112; 370/37; 340/825.44
[58] Field of Search ............... 370/112, 37, 110.1, 370/105.5, 84, 110.4; 375/19, 17; 340/825.44, 825.47; 455/31, 32

[56] References Cited

U.S. PATENT DOCUMENTS

| | | | |
|---|---|---|---|
| 2,650,266 | 7/1948 | Browning | 370/37 |
| 2,674,653 | 4/1954 | Rudolph et al. | 370/37 |
| 2,971,059 | 2/1961 | Heaton-Armstrong | 370/37 |
| 2,989,591 | 6/1961 | Heidester | 370/37 |
| 3,048,657 | 8/1962 | Buff | 370/37 |
| 4,498,166 | 2/1985 | Esposito | 370/112 |

Primary Examiner—Douglas W. Olms
Assistant Examiner—H. Kizou
Attorney, Agent, or Firm—Daniel R. Collopy; Vincent B. Ingrassia; WIlliam E. Koch

[57] ABSTRACT

A communication system has an information signal having a plurality of data streams. The data streams are simultaneously modulated on a multi-level symbol transmission. The data streams may have either independent or dependent signalling protocols. A transmitting device generates the information in one of several embodiments. A first receiver receives the information signal and process only a first data stream for messages. A second receiver receives the information signal and process only the second data stream for meassages. A third receiver is capable of selectively receiving and processing a plurality of data streams. The third receiver is shown in several embodiments for selecting the data streams.

25 Claims, 8 Drawing Sheets

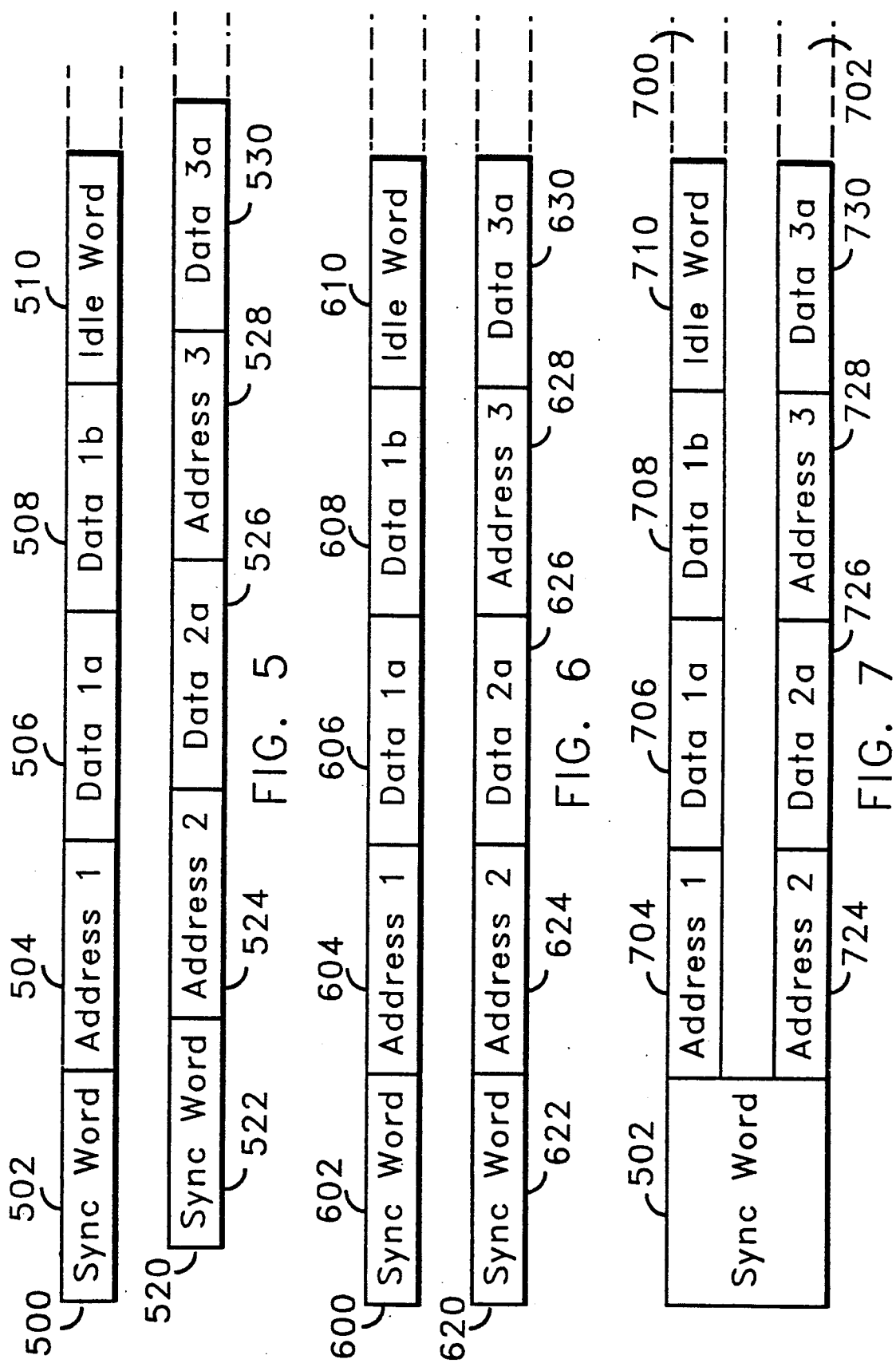

FIG. 8

| Sync Word | Address 1 | Data 1b | Data 2a | Address 3 | Data 3a |
|---|---|---|---|---|---|
| Control | Data 1a | Address 2 | Idle Word | | |

| Sync Word | Address 1 | Data 1b | Data 2a | Address 3 | Data 3a |
|---|---|---|---|---|---|
| | Data 1a | Address 2 | Idle Word | | Data 3b |

| Sync Word | Addr 1 | Data 1a | Data 1b | Idle | Address 2 | Data 2a |
|---|---|---|---|---|---|---|

924, 925, 926, 927, 928, 930, 932

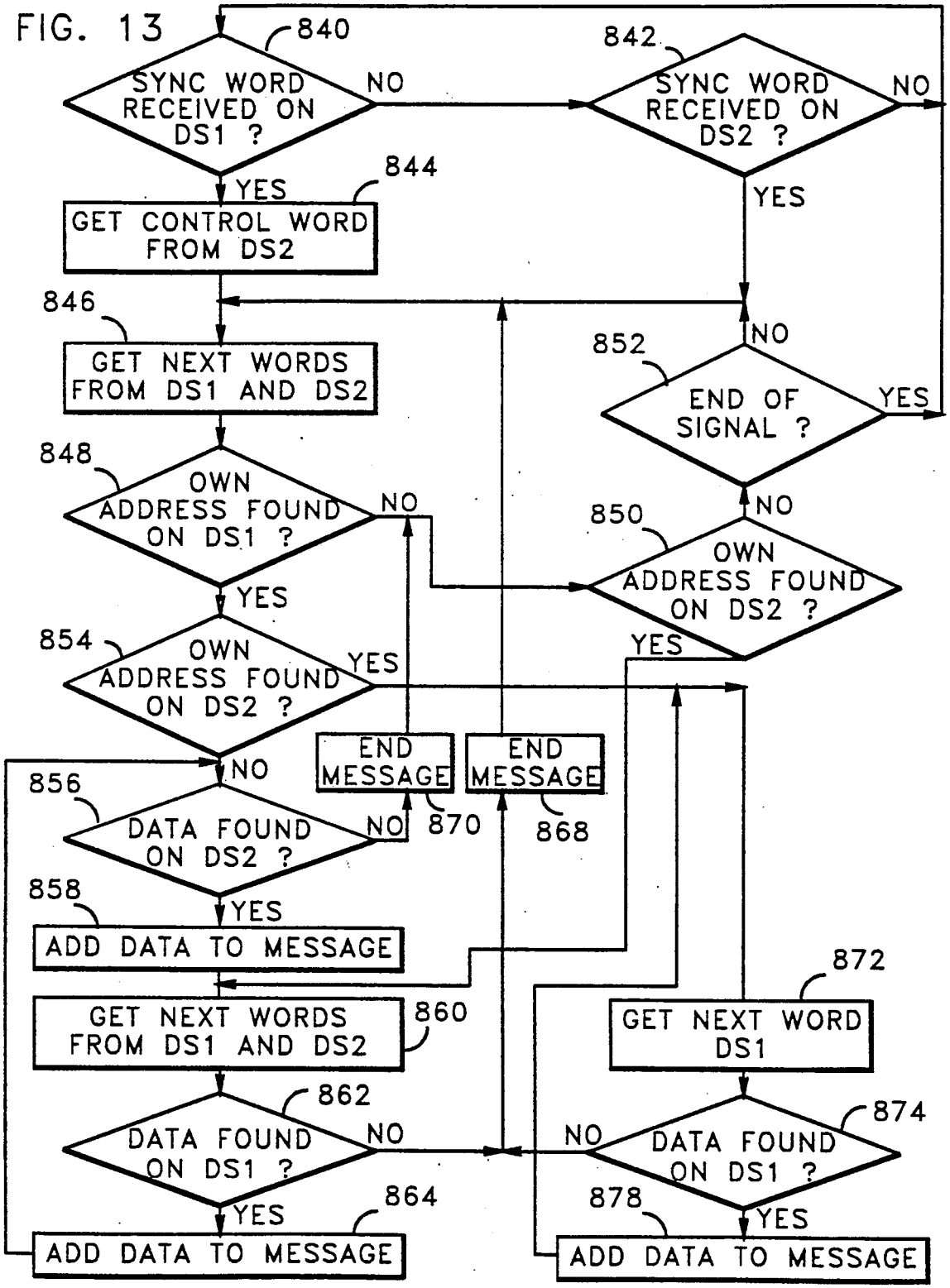

MIXED MODULATION LEVEL COMMUNICATION SYSTEM

BACKGROUND OF THE INVENTION

This invention relates generally to radio frequency signaling methods used in communication systems. More specifically this invention relates to a multi-level frequency modulated signalling system having at least two data streams and the receiving means for receiving the signal. Although the communication system is described in view of a paging system, it is to be understood that the invention described herein is not limited to paging systems.

Early paging systems used unique tone signals to frequency modulate (FM) or amplitude modulate (AM) a radio frequency carrier. These unique signals were directed to a specific pager wearer to sound an alert and to activate the audio section of his receiver for a voice message which followed. Because of the length of a typical voice messages is 10 seconds or longer a fully loaded radio channel might have the capacity to serve only 1,000 to 3,000 customers. The selective call tone signalling portion of these transmissions required a small percentage of the total channel air time of a typical voice message. Recognizing the need to serve more users per channel a tone only class of service was developed. These tone only signals took very little air time thus paging service could be provided at much lower cost than for voice service. A fully loaded RF channel of tone only paging might service 50,000 to 100,000 users.

Very little information is communicated to the pager wearer in a tone only page ie a first tone sequence would indicate "call home", while if the pager was equipped to receive a second tone sequence it might indicate "call the office". The need for a service with higher channel capacity than voice and higher information content than tone only became apparent.

The more recent development of low power battery operated message displays and changes in the radio frequency modulation methods from tone to digital made it possible to send data messages to pagers in much less channel air time than the equivalent voice message.

The advent of numeric data display paging resulted in tremendous growth in the paging user base. This increased customer demand for data paging service combined with the increased information content of a message received by a pager has created channel congestion especially in the high population density areas of the world. Many paging system owners in these urban areas are being forced to improve existing systems or acquire additional RF channels along with all the accompanying equipment, antenna sites and interconnect equipment required to implement new systems, in order to meet the demand for paging service.

Those system owners that choose to modify existing overcrowded systems must start retiring pagers using slow speed signaling protocols and replace them with pagers operating at higher speed signaling protocols. At present this requires that the available RF channel air time must be shared in a gross way between at least two separate signaling protocols. The newer signaling protocol must appear often enough on the channel to provide a reasonable grade of service while maintaining the older signalling protocols. When the wait time measured from the time a message originates with a telephone call to the time it is received by the paging receiver is too long it tends to be interpreted by the page initiator as a missed page resulting in a second call being entered, thus further congesting the channel. It is quite obvious that this transformation of a paging system would benefit from a less disruptive change. A method which did not require large intervals of time to be removed from the already over crowded channel in order to start the conversion to a higher speed protocol would be a big improvement. A method which overlaid the existing protocol without interfering with the existing protocol would be ideal.

As describe above it is of great importance to the owner of an existing over crowded paging system to acquire the tools for an up grade to higher capacity at reasonable cost with minimum disruption to his existing customer base, and to provide of future expansion using higher data rate signalling protocols.

SUMMARY OF THE INVENTION

It is therefore an object of the invention to alleviate the aforementioned problems.

It is yet another object of the invention to provide a paging system capable of communicating independent messages simultaneously to independent pagers.

It is yet another object of the present invention to provide a paging receiver capable of receiving a plurality of modulation techniques and selectively chosing a demodulation technique.

In accordance with the present invention, a transmitting means comprises a first data stream means for generating a first data stream having a plurality of binary bits. The transmitting means further comprises a second data stream means for generating a second data stream having a plurality of binary bits. The transmitting means further comprises a combining means for combining the first data stream and the second data stream to form a combined data stream including a plurality symbols, each symbol having at least a first portion of a bit from the first data stream and a bit from the second data stream. And the transmitting means further comprises a modulating means for transmitting the symbol.

In further accordance with the present invention, a message receiving system receives a plurality of messages transmitted within a plurality of symbols, each symbol having at least first, second, third and fourth levels. The message receiving system comprises a first selective call for receiving the plurality of symbols. The first selective call receiver includes a first receiving means for receiving and demodulating the symbols, and a first digitizing means for generating a first binary state in response to a symbol having either the first or second levels and for generating a second binary state in response to the symbol having the third or fourth levels, wherein in response to the plurality of symbols, said first digitizing means generates a plurality of first bits and wherein a first message for said first selective call receiver is included within the plurality of first bits, and a first decoding means responsive to the plurality of first bits for extracting the first message. The message signalling system further comprises a second selective call for receiving the plurality of symbols. The second selective call receiver includes a second receiving means for receiving and demodulating the symbols, and a second digitizing means for generating a first binary state in response to a symbol having either the first or fourth levels and for generating a second binary state in response to the symbol having the second or third levels, wherein in response to the plurality of symbols, said second digitizing means generates a corresponding plurality of second bits and wherein a second message for said second selective call receiver is included within the plurality of second bits, and a second decoding means responsive to the plurality of second bits for extracting the second message.

In further accordance with the present invention a selective call receiver has a predetermined address and receiving a message transmitted within a plurality of symbols, each symbol having at least first, second, third and fourth levels. The selective call receiver comprises a receiving means for receiving and demodulating the symbols. The selective call receiver further comprises a digitizing means for generating a first signal having a first state in response to a symbol having either the first or second levels and for generating the first signal having a second state in response to the symbol having the third or fourth levels, and further for generating a second signal having a first state in response to a symbol having either the first or fourth levels and for generating the second signal having a second state in response to the symbol having the second or third levels, wherein in response to the plurality of symbols, digitizing means generates a corresponding plurality of first signals and a corresponding plurality of second signals and wherein the message for said selective call receiver is included within the plurality of first and second signals. The selective call receiver further comprises a decoding means responsive to the plurality of first and second signals for receiving and processing the message.

DESCRIPTION OF THE DRAWINGS

FIG. 5 shows a signal having two independent protocols transmitted on a first and second data stream.

FIG. 6 shows an embodiment of the present invention where the message protocols of a first and second data stream are identical and align on bit and word boundaries.

FIG. 7 shows an embodiment of the present invention where a synchronization word is transmitted on a common data stream and independent messages are transmitted on a first and second data streams.

FIG. 8 shows another embodiment of the present invention where the a first data stream is received and processed by a first pager and both data streams may be received and processed by a second receiver.

FIG. 9 shows another embodiment of the present invention where the synchronization word transmitted on a common data stream, and messages are transmitted on first and second data streams.

FIG. 10 shows another embodiment of the present invention where a system has mixed modulation techniques.

FIG. 13 shows a flow chart of operation of the decoder of the second pager capable of receiving and processing a signal shown in FIG. 8.

DESCRIPTION OF THE PREFERRED EMBODIMENT

Figure 1:
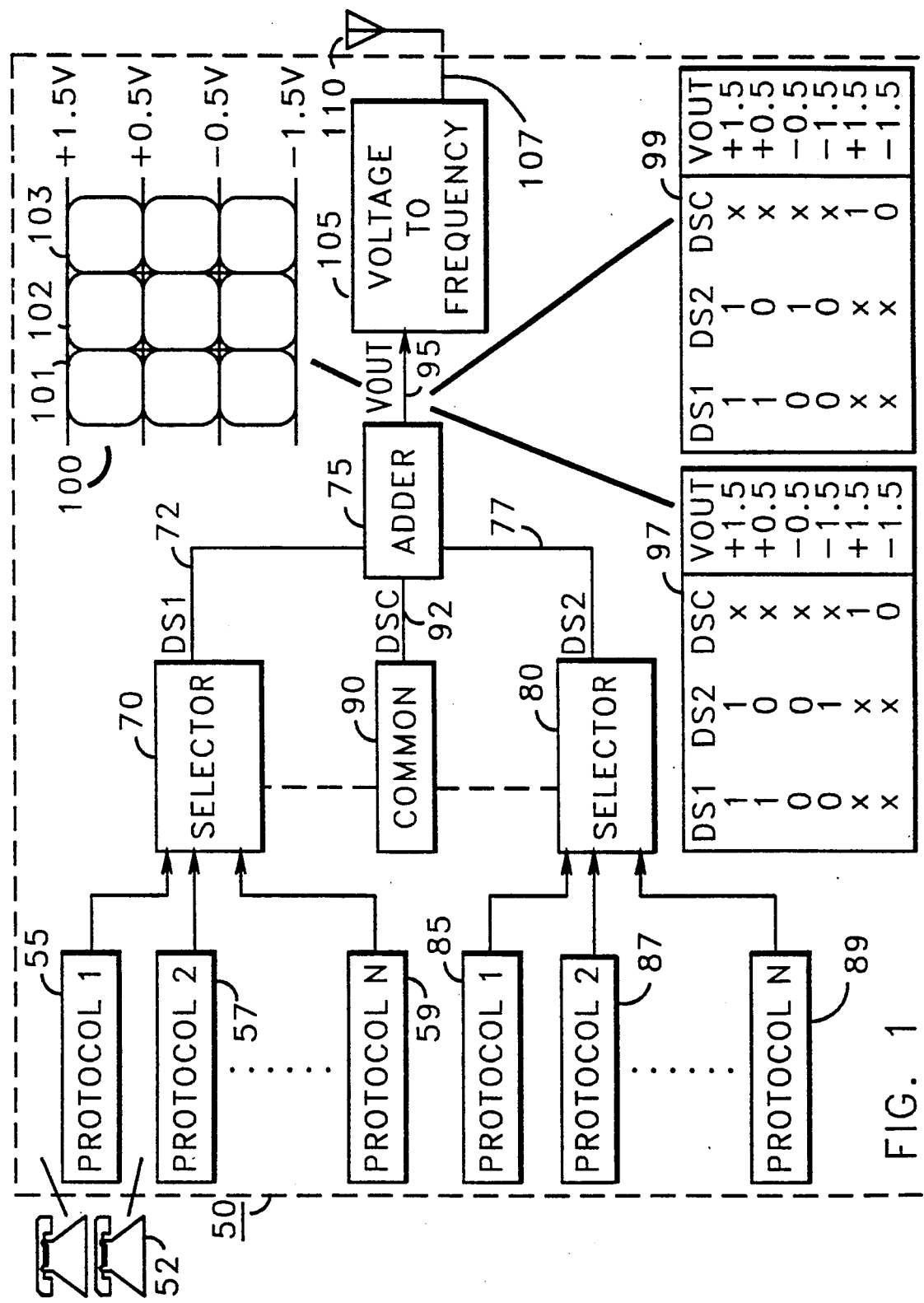
FIG. 1 shows a transmitting means operating in accordance with the present invention.

FIG. 1 shows a transmitting means operating in accordance with the present invention. Transmitting means 50 receives messages from a plurality of sources such as telephone 52. The messages are received by the transmitting means converted into one of a plurality of protocols. A first protocol 55, Protocol 1, may be a 1,200 bit per second POCSAG protocol. The second protocol 57, Protocol 2, may be a GSC paging protocol which has bit rates of 300 and 600 bits per second. And a final protocol 59, protocol n, may be another signaling protocol used in paging. Selector means 70 selects a paging protocol for transmission by the transmitting means. Selector means 70 selects protocols and generates a first data stream (DS1) 72, which is made available to adder 75. A second data stream (DS2) 77, is generated by selector means 80 which similarly selects from protocols 85, 87, and 89.

DS1 and DS2 are binary data streams each having either a binary state of 1 or 0 depending on the messages and information within the protocol selected. Adder 75 adds DS1 and DS2 and produces an output voltage 95. When two protocols are added by adder means 75, the two protocols have integerly related bit rates and the bit transitions are aligned.

A protocol such as protocol N 59 and 89 may be related protocols where the information on DS1 is related to the information on DS2. Furthermore, when related protocols are on DS1 and DS2, a common data means 90 may be used to transmit information common to both data streams (DSC) signal 92. Adder 75 is further responsive to the common data means 90.

Table 97 shows a first method for producing an output voltage signal 95 from a DS1, DS2, and DSC. Table 99 shows a second method for producing the output voltage signal 95. Referring to Table 97 if DSC is inactive, as indicated by an "x" in the column under DSC, and if DS1 and DS2 both have binary states of 11, 10, 00, and 01 the output voltage is +1.5V, +0.5V, −0.5V, and −1.5V respectively. While if DSC is present and the output voltage signal 95 is +1.5 and −0.5 if DSC is a 1 or 0 respectively. The alternate embodiment for adder 75 as shown in Table 99. Referring to Table 99 if DSC is inactive, as indicated by an "x" in the column under DSC, and if DS1 and DS2 both have binary states of 11, 10, 01, and 00 the output voltage is +1.5V, +0.5V, −0.5V, and −1.5V respectively. While if DSC is present and the output voltage signal 95 is +1.5 and −1.5 if DSC is a 1 or 0 respectively.

The bit rates of the bits on DS1 and DS2 are integerly related and the phase of the transitions of the bits are synchronized. In such a condition an eye pattern is generated on the output voltage signal 95. A typical multi-level eye pattern is shown as eye pattern 100 of FIG. 1. Eye pattern 100 shows all of the possible variations of adding 3 bits from DS1 with 3 bits from DS2.

The adding of three bits from both data streams results in 3 symbols, 101, 102, and 103 each having four possible voltage levels resulting from the addition of the respective bits of DS1 and DS2. It can be appreciated that the bit rate of one of the data streams can be an integer multiple of the bit rate of the other data stream while maintaining the multi-level voltage eye pattern 100. Finally the output multi-level voltage signal 95 is converted into a radio frequency by voltage to frequency converting means 105. The multi-level voltages results in a multi-level frequency modulated radio signal 107 which is transmitted over the air through the antenna 110.

Figure 2:
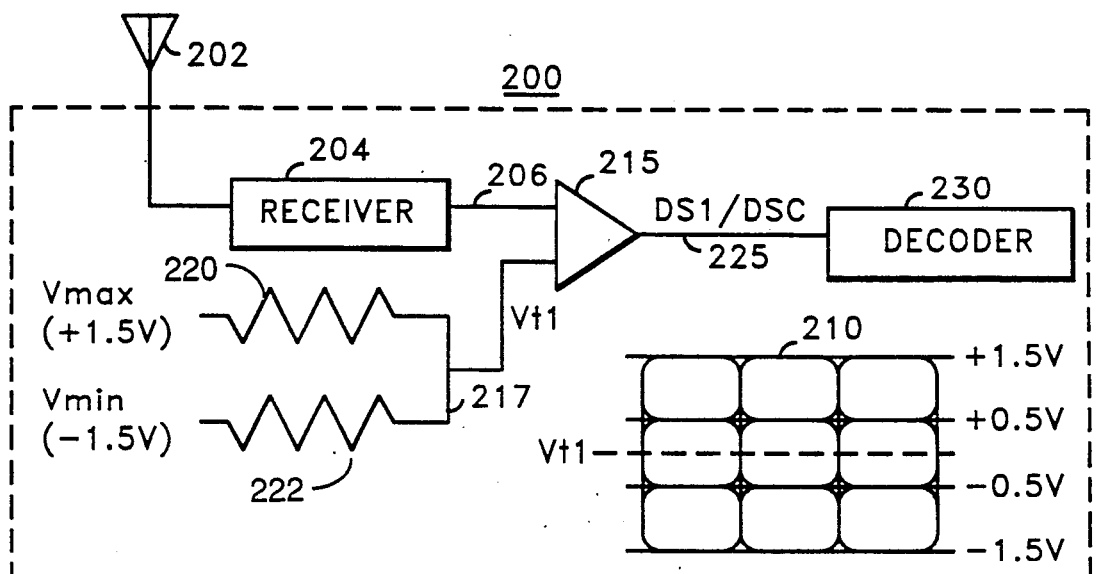
FIG. 2 shows a receiving means capable of receiving and processing a first data stream or a common data stream transmitted by transmitting means of FIG. 1.

FIG. 2 shows a receiving means capable of receiving DS1 or DSC when transmitted by transmitting means 50 of FIG. 1. Receiving means 200 receives the radio frequency signal on antenna 202. The received signal is demodulated by receiving means 204 which converts to multi-level frequency modulated signal back into a multi-level voltage signal on line 206. An eye pattern of line 206 is shown as 210. The multi-level voltages are compared by comparator 215. A second input of comparator 215 has an input threshold voltage 217 which is generated by taking the average of the maximum eye pattern voltage 1.5V, and the minimum eye pattern voltage −1.5V. This is done using a voltage dividing means having a resistors 220 and 222 both having equivalent resistance values. The input threshold voltage is shown on eye pattern 210 as Vt1.

It can be appreciated that the output of comparitor 215 is a binary 1 in response to a voltage level of +1.5 or +0.5V and that the output of comparitor 215 is a binary 0 if the voltage level is −0.5 or −1.5V. When adder 75 of FIG. 1 adds the data channels using either embodiment shown by Table 97 or Table 99 the binary output of comparitor 215, signal 225, is equivalent to DS1 or DSC of FIG. 1. Thus, the protocol selected by selector 70 of FIG. 1 appears on data stream 225 of FIG. 2. This data stream is then received and processed by decoding means 230 which processes the paging protocol in a known manner.

Thus, FIG. 1 shows a transmitting means which adds a bit from a first data stream and a bit from a second data stream to make a symbol wherein the plurality of bits from the data channels form a plurality of symbols. The plurality of symbols are transmitted and received by a receiver shown in FIG. 2. The receiver receives the symbols containing both data streams and digitizes the received symbol into only the first data stream. The bits of the first data stream are decoded by decoding means 230 in a manner known to those familiar with the art.

Figure 3:
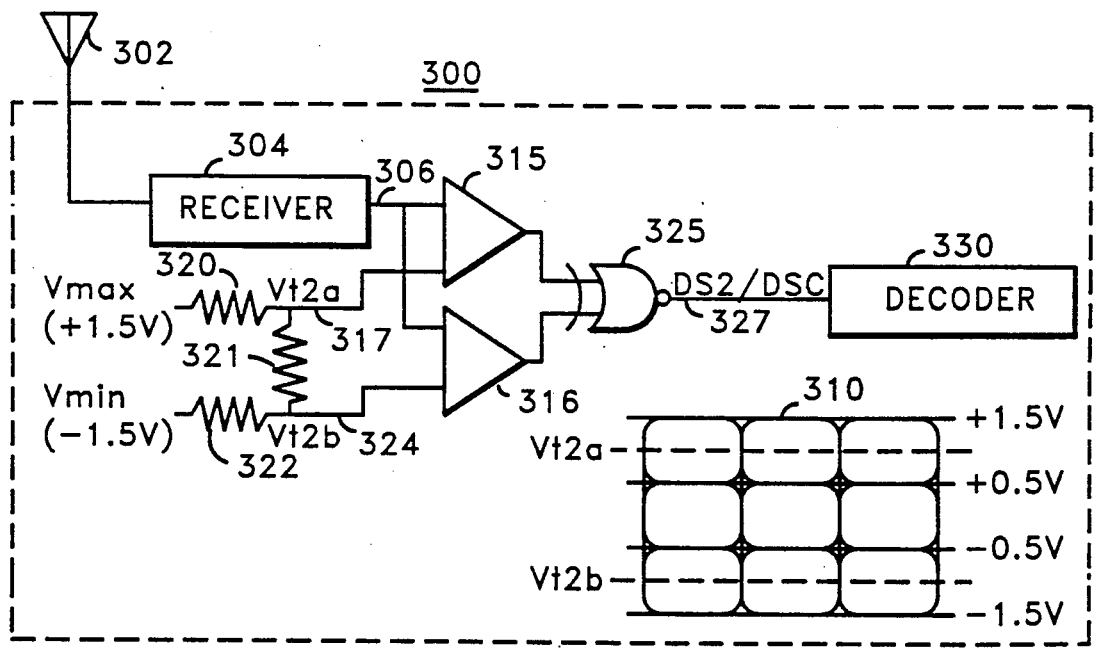
FIG. 3 shows a receiver which receives the symbols transmitted by transmitting means of FIG. 1 and processes the second data stream or the common data stream.

FIG. 3 shows a receiver 300, which receives the symbols transmitted by transmitting means 50 and demodulates only DS2 or DSC. The frequency modulated symbols are received by antenna 302 and processed by receiving means 304. Receiving means 304 and receiving means 204 may be substantially identical. The voltage signals 306, demodulated by receiving means 304, are shown as eye pattern 310 and are identical to eye pattern 210 of FIG. 2. These voltage signals are input to comparitors 315 and 316. Comparitor 315 has a comparison input voltage 317 which is derived from a voltage dividing means having resistors 320, 321 and 322. The value of resistors 320 and 322 are equivalent. The value of resistor 321 is approximately four times the value of either resistor 320 or resistor 322. One terminal of resistor 320 is connected to the maximum eye pattern voltage of +1.5V and one terminal of resistor 322 is connected to the minimum eye pattern voltage of −1.5V. Thus, the voltage 317 input to comparitor 315 is shown as a first threshold voltage which is between +1.5 and +0.5V. This voltage is shown on eye pattern 310 as Vt2a. The voltage comparison input to comparitor 316 is voltage 324 which is derived from the same voltage dividing means and has a voltage between −0.5 and −1.5V. This voltage is shown on eye pattern 310 as Vt2b. The outputs of comparitor 315 and 316 are input to XOR gate 325. The output of XOR gate 325 produces a binary signal 327 which is received and processed by decoding means 330 in a manner similar to decoding means 230. When adder 75 operates according to Table 97, receiver 300 operates to reproduce either DS2 or DSC at the output of XOR gate 325. Thus, the decoding means 330 receives and processes the protocol selected by selector 80.

Thus, FIG. 1 shows the transmitter transmitting a plurality of protocols in a plurality of symbols wherein the receiver of FIG. 2 receives a first protocol and the receiver of FIG. 3 receives a second protocol. The protocols may be independent and have bit rates which are integerly related.

Figure 4:
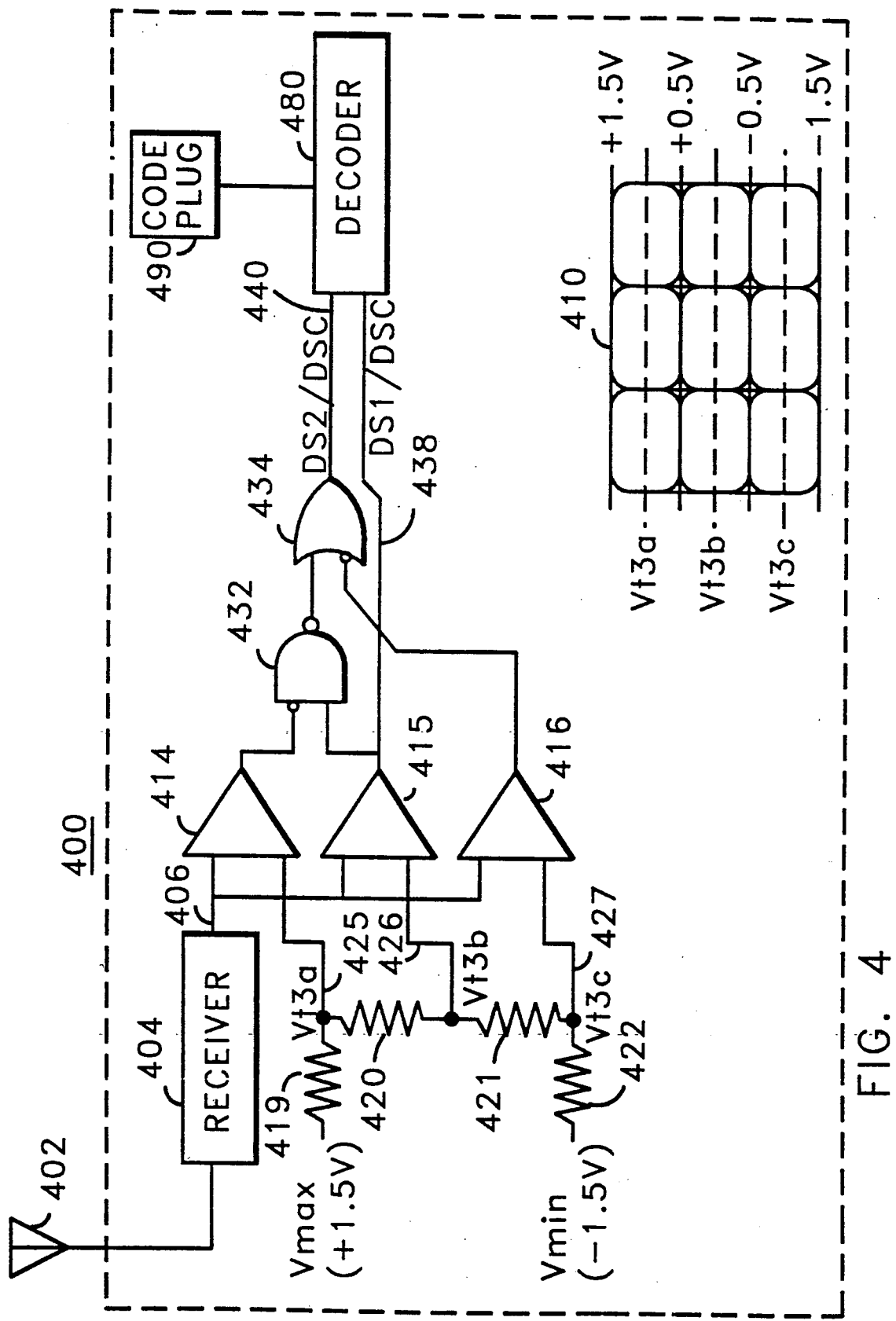
FIG. 4 shows a receiver for receiving and processing a first data steam, a second data stream and a common data stream transmitted by the transmitting means of FIG. 1.

FIG. 4 shows a receiver 400 for receiving DS1, DS2, and DSC. The frequency modulated symbols are received by antenna 402 and processed by receiving means 404. Receiving means 404 may be identical to receiving means 304 and 204. The output signal 406 is shown as eye pattern 410. Signal 406 is supplied to comparitors 414, 415, and 416. A resistor dividing means consisting of resistors 419, 420, 421, and 422 form a plurality of threshold voltages. The input to the resistor network is the maximum voltage of the eye pattern +1.5V and the other input to the resistor network is coupled to resistor 422 and is the minimum voltage, −1.5V of the eye pattern. The input comparison voltage to comparitor 414, is signal 425, which is a voltage value between +1.5V and +0.5V as shown as Vt3a on eye pattern 410. The comparison voltage signal 426 input to comparitor 415 is a voltage between +0.5 and −0.5V and is shown as Vt3b on eye pattern 410. And the comparison input voltage for comparitor 416 is shown signal 427 and is a threshold voltage Vt3c as shown on eye pattern 410, and is between −0.5 and −1.5V.

By inspection, the output of comparitor 415 is equivalent to DS1 or DSC. The output of comparitor 415 is also coupled to the input of AND gate 432. The inverting input of AND gate 432 is coupled to the output of comparitor 414. The output of AND gate 432 is coupled to the input of OR gate 434. The inverting input of OR gate 434 is coupled to the output of comparitor 416. The output of OR gate 434 is equivalent to DS2 or DSC when adder 75 implements the embodiment shown in Table 99. It can be appreciated by those skilled in the art that an alternate logic configuration within receiver 400 can reproduce DS2 when implemented per Table 97.

Thus DS1 is reconstructed in receiver 400 as signal 438 and DS2 is reconstructed in receiver 400 as signal 440. When DSC is transmitted, both signal 438 and 440 carry DSC. Both data streams are coupled to the input of decoder means 480. Consequently, decoder 480 has available DS1, DS2, and DSC for processing. The decoder may selectively process either the first data stream or the second data stream. In one embodiment of the invention, the receiver may have a code plug 490 which contains a bit indicating which of the two data streams the decoder is to receive and process. If a bit in the code plug is programmed to a first state the decoder 480 will receive and process DS1 while if the bit is programmed to a second state decoder 480 will receive and process DS2.

FIG. 5 shows a signal having two independent protocols transmitted on DS1 and DS2. Line 500 shows a first data protocol which may be included within DS1, and line 520 shows a second protocol which may be included within DS2. Both data streams may transmit data using an identical protocol such as a POCSAG protocol while each data stream has independent information and messages. The first protocol on DS1, shown as line 500, is received by a first paging receiver such as receiver 200 and the second protocol on DS2 shown as line 520, is received by a second paging receiver such receiver 300. Similarly, the protocol on line 500 may be the GSC paging protocol and the protocol on line 520 may be the POCSAG paging protocol at 1,200 bits per second.

Line 500 can represent a first typical POCSAG protocol message transmission which begins with a synchronization word 502 followed by a message. The message consists of an address word 504 followed by two data words 506 and 508. An idle word, 510 follows the message. Line 520 shows a second typical POCSAG message transmission which begins with a sync word 522 followed by a message having an address word 524 and a data word 526. A subsequent message follows which has an address word 528 followed by a data word 530.

In this embodiment a first pager, such as the pager of FIG. 2 receives the message of line 500 and a second pager, such as the pager of FIG. 3 receives the messages of line 520. Thus a single transmission of information symbols is received by two different paging receivers while each receiver receives only messages intended for each pager.

Note that the word boundaries of line 500 and 520 do not align, it is only necessary that the bit boundaries align for the proper operation of this embodiment.

FIG. 6 shows an embodiment of the present invention where the message protocols of DS1 and DS2 are identical and align on bit and word boundaries. Line 600 and 620 corresponds to the protocol transmitted on DS1 and DS2 respectively. The synchronization and messages words 602-630 of FIG. 6 correspond to the synchronization and messages words 502-530 of FIG. 5. The difference here being that the word boundaries between DS1 and DS2 are aligned.

This system has the advantage of operating battery saver strobes of receivers of FIGS. 2 and 3 in unison, which provides for better timing when switching to alternate signalling protocols such as prior art protocols which include analog voice signals.

A further application of FIG. 6 is for a receiver capable of receiving both data streams, such as the receiver of FIG. 4, wherein the decoding means is only capable of decoding one data stream at a time.

Figure 12:
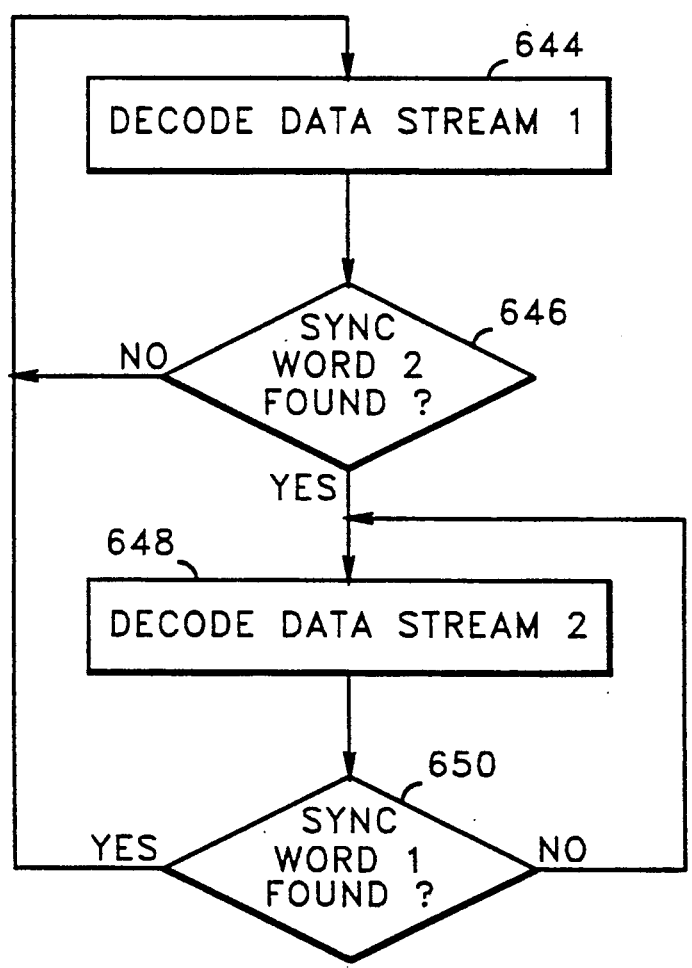
FIG. 12 shows a flow chart of the operation of the decoder of FIG. 6 which selects between the data streams

FIG. 12 shows a flow chart of the operation of the decoder of FIG. 6 which selects between the data streams. In step 644, the decoder is decoding DS1. If a sync word matching the type 2 sync word is found in step 646, the decoder begins decoding data steam 2, step 648. Note that the decoding of DS2 may begin with bit synchronization and word synchronization acquired on DS1. If a sync word matching a type 1 sync word is found in step 650, the decoder begins decoding the DS1, step 644 with bit and word synchronization of the DS2. Note that in alternate embodiments, the word synchronization and/or the bit synchronization may be disregarded when switching from the decoding of the data streams.

FIG. 7 shows an embodiment of the present invention where the synchronization word 502 is generated by the common data means and transmitted as DSC. Line 700 and 720 corresponds to the protocol transmitted on DS1 and DS2 respectively. The messages words 704-730 of FIG. 7 correspond to the messages words 504-530 of FIG. 5.

In this embodiment pagers operation according to either FIGS. 2, 3, or 4 would receive the synchronization word and decode messages from either DS1 or DS2 according to their design. Furthermore, the pager of FIG. 4 operating in accordance with the flow chart of FIG. 12 would also operate on the signal of FIG. 7.

FIG. 8 shows another embodiment of the present invention where the a first data stream is received and processed by a first pager and both data streams may be received and processed by a second receiver. The first pager is configured according to FIG. 2 and the second paging receiver is configured according to FIG. 4. Line 800 shows the signals transmitted on DS1 and line 820 shows the signals transmitted on DS2. Both pagers receive synchronization word 802 since both pager are capable of receiving and processing DS1. The second receiver further being capable of processing DS2 receives control word 803. Control word 803 may include additional information for use by the second pager. The additional information may include battery saving information such as the locations of addresses on DS1 and DS2. Such a control word is disclosed in allowed U.S. Pat. No. 07/199,732 to DeLuca et al. which is hereby incorporated by reference. The additional information is not received and process by the first receiver because the first receiver is not capable of receiving and processing DS2, consequently, the second pager will have improved battery saver when the control word 803 has battery saver information.

After synchronization, both pagers receiver "Address 1", word 804. If Address 1 belongs to the second pager, the second receiver checks word 806 on DS2 for data. The first data portion of the message is in word 806. The second pager then checks the next word on DS1, word 812 for more data and add that to the message. Upon finding no data on the next word of DS2, word 814, the second pager ends the message, and searches for its own address in word 814 of DS2. Word 816 of DS1 has data associated with the address in word 814. Word 818 of DS2 is an idle word used to fill DS2 in order to transmit the third message.

The third message is included within words 820 and 822. The third message is generated by the common means and is present on both DS1 and DS2. Consequently, the message may be received by either a pager capable of receiving only DS1 or DSC or a pager capable of receiving and processing DS1, DS2 and DSC. In this situation, a pager capable of receiving and processing both DS1 and DS2 finds its own address on both DS1 and DS2, and thereinafter processes only DS1 for the remainder of the message.

FIG. 13 shows a flow chart of operation of the decoder of the second pager capable of receiving and processing both DS1, DS2 and DSC. In steps 840 and 842 a synchronization word is searched for on DS1 and DS2 respectively. If found on DS1 and not on DS2, step 844 process a control word 803. In step 846 the next two words from DS1 and DS2 are processed. If the address of the pager is not found in steps 848 and 850, the end the signal is checked for in step 852. Steps 846-852 are repeated until either the address of the pager is found or the signal is ended. If the signal is ended, step 840 is returned to. If the address of the pager is found in step 848 in DS1, the address of the pager is checked in DS2 in step 854. If not found, step 856 checks for data in DS2. If found in step 858, the data is added to the message and the next two words from DS1 and DS2 are processed in step 860. Note that step 860 is also executed in response to finding the address of the pager in a DS2 word in step 850. If in step 862, data is found in DS1, the data is added to the message being received in step 864 thereafter, the operation returns to step 856. If data is not found in DS1, step 862, the message is ended in step 868 and step 846 is returned to. If data is not found in DS2 of step 856, the message is ended in step 870 and the address of the pager is tested in step 850. If the address of the pager is found in DS1, step 848 and in DS2, step 854, that DSC signal is being received and the pager executes steps 872 through 878 where only DS1 is processed for the remainder of the message.

Thus the flow chart of FIG. 13 shows a pager capable of receiving a synchronization word on either DS1 or DS2 and then searching for the address of the pager on either DS1 or DS2, and receiving and processing message information on both DS1 and DS2. If the address of the pager is detected on both DS1 and DS2 simultaneously, the determination that DSC is being received is made and the message is precessed on only one of the data streams.

It should be further appreciated by those skilled in the art that in another embodiment the pager of FIG. 13 could determine that the DSC was being transmitted for all messages by detecting the synchronization code on both DS1 and DS2 in steps 840-842. In response to which the pager may only process one of the data streams for the address of the pager as opposed to both data streams as shown in FIG. 13.

FIG. 9 shows another embodiment of the present invention where the synchronization word 902 is transmitted on DSC, two messages in words 904-918 are transmitted on DS1 and DS2, corresponding to the messages in words 804-818 of FIG. 8. In this embodiment the synchronization word is transmitted without a control word for use by the pager capable of receiving and processing both DS1 and DS2.

The method of sending messages as shown in words 804-818 and 904-918 of FIGS. 8 and 9 respectively provides improved fading protection. Reception of paging signals is often disrupted by fades which temporarily cause the signal strength to become weak and result in bit errors. Protocols used in paging provide for a limited number of bit errors. For a protocol which provides for one bit error correction in a 32 bit word, the maximum fade length is equivalent to one bit time when transmitting a single data stream. The paging receiver operating on words 804-818 receives bits at twice the symbol rate. If a single data stream were used the bit rate would have to double in order to achieve an equivalent bit rate processed by the receiver. Doubling the bit rate would half the maximum fade length for a word. By sending messages as shown in words 804-818 a fade length equivalent to one symbol, or two bits, is realized. A symbol error would result in one bit error in a word on DS1 and one bit error in a word on DS2. One bit error in each word is correctable. Thus the invention provides for effectively doubling the bit rate while maintaining the a constant maximum fade length.

A second message is transmitted on words 9120, 921 and 922 of FIG. 9. The address, word 920, of the second message is transmitted on DSC and the first data word, word 921 is on DS1 and the second data word of is on word 922. A pager operating on this signal would operate according to the flow chart of FIG. 13 with the exception that steps 872-878 would check both DS1 and DS2 for the message, as in steps 856-864. Upon checking both DS1 and DS2, the data could be checked to be different, and if different, it would be processed as two data words of the second message. If however the data words were the identical, the data words could be processed as a single data word as in the message of words 820 and 822 of FIG. 8. Thus a pager operating in such a manner would be capable of be able to selective receive and process a message of the type shown in words 820-800 or of the type shown in words 920-922 by checking for differences in the data words on DS1 and DS2 after the address is detected.

FIG. 10 shows another embodiment of the present invention where a system has mixed modulation techniques. A first paging receiver receives information on a single data channel, while a second receiver receives information on a plurality of data channels, where the bits of each word of a message are on the plurality of data streams. In a four level system, a word would have even and odd bits where the even bits are transmitted on DS1 and the odd bits are transmitted on DS2. The second paging receiver takes the even bits from DS1 and the odd bits from DS2 in order to reconstruct the word and process the word in a manner know to those familiar with the art.

Synchronization word 924, transmitted on DSC, synchronizes both the first and second pagers. The second pager receives and process its message from DS1 and DS2 which consists of an address 925 and two data words 926 and 927. Idle word 928 fills the remaining slot. During words 925-928, the first receiver processes only the even bits of the words. The address falsing characteristics of the paging protocol insures that the address of first pager is not detected during words 925-928. Words 930 and 932 are transmitted on DSC and include a message having an address word 930 and information word 932 for the first pager. The second pager process each bit of address 930 as a bit from DS1 plus a bit from DS2. The address falsing characteristics of the paging protocol insures that the address of second pager is not detected during words 930-932. FIG. 10 provides for mixing modes of modulation in a paging system where a first paging receiver is responsive to the first mode of modulation and a second paging receiver is responsive to a second mode of modulation and both paging receivers synchronize to a common synchronization signal.

Figure 11A:
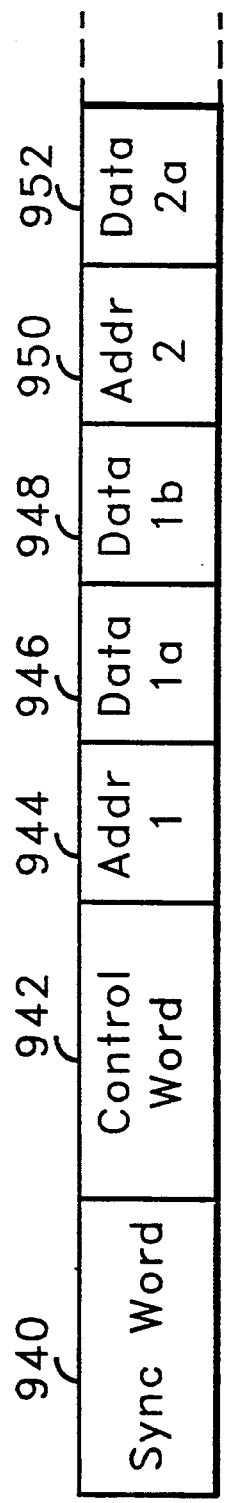
FIGS. 11A and 11B shows a transmission having a synchronization word transmitted with a predetermined modulation and followed by a control word indicating the modulation of the following information.

FIG. 11A shows a transmission having a synchronization word transmitted with a predetermined modulation and followed by a control word indicating the modulation of the following information. Synchronization word 940 and control word 942 are transmitted on DSC. A first paging receiver capable of receiving only one data stream synchronizes to word 940 but cannot process message information within words 944-952 which are transmitted using a multi-level symbol technique as described in words 925-928. A second paging receiver capable of selectively demodulating multi-level symbols decodes synchronization word 940 and control word 942 selects a multi-level demodulation technique corresponding the technique indicated by control word 942. The second receiver then receives and processes the multi-level information of messages within words 944-952.

Figure 11B:
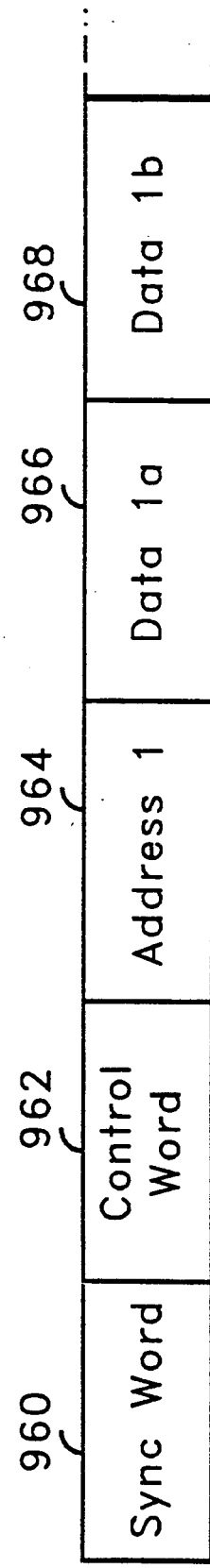

FIG. 11B shows a transmission having a synchronization word transmitted with a predetermined modulation and followed by a control word indicating the modulation of the following information. Synchronization word 960 and control word 962 and are transmitted on DSC. The first paging receiver capable of receiving only one data stream synchronizes to word 940 and can process message information within words 964-968 which are also transmitted on DSC. The second paging receiver capable of selectively demodulating multi-level symbols decodes synchronization word 960 and control word 962 selects a demodulation technique corresponding the technique indicated by control word 962. The second receiver then receives and processes the information of messages within words 964-968 as information transmitted on DSC.

FIG. 11A and 11B show a signal sent to a paging receiver capable of selectively decoding one of a plurality of modulation techniques. The signal includes a control signal indicative of the modulation of the signal following the control word. The paging receiver, in response to the control word selects a corresponding demodulation technique. The signal of FIGS. 11A and 11B are also received by another paging receiver only capable of receiving and processing a single modulation technique. The signal includes a synchronization signal which both paging receiver can receive and process, and the single modulation technique pager receives messages when the signal contains information transmitted on a corresponding modulation technique.

It should be appreciated that words 944-952 may be transmitted using any number of modulation techniques while remaining within the scope of the invention. Although the signal is described in view of a four level frequency modulation, the words could be also sent with three level frequency modulation, or a frequency modulation technique having more than four levels. Furthermore, the modulation need not be restricted to frequency type modulation and may include other known modulation techniques such as phase, amplitude, and spectrally efficient delta modulation techniques.

While the above principles of the invention have been described with a specific apparatus, it is to be clearly understood that this description is made by way of example only and not a limitation to the scope of the invention as set forth in the accompanying claims.

What is claimed is:

1. A transmitting means comprising:
   first data stream means for generating a first data stream having a plurality of binary bits;
   second data stream means for generating a second data stream having a plurality of binary bits;
   common data stream means for generating a common data stream having a plurality of bits, wherein said common data stream inactivates said first and second data stream means in order to generate the common data stream;
   combining means for combining the first data stream and the second data stream to form a combined data stream including a plurality of symbols in response to said common data stream not inactivating said first and second data stream means, each of said plurality of symbols defined in response to a bit from the first data stream and a coincident bit from the second data stream and for generating the plurality of symbols each of said plurality of symbols defined in response to a bit from the common data stream means in response to the common data stream inactivating said first and second data stream means;
   modulating means for transmitting the plurality of symbols.

2. The transmitting means of claim 1 wherein the first data stream means generates said first data stream comprising a first message for reception by a first selective call receiver and the second data stream means generates said second data stream comprising a second message for reception by a second selective call receiver, and further wherein the common data stream means generates said common data stream for reception by said first and second selective call receivers, said common data stream comprising a synchronization signal for synchronizing the first and second selective call receivers to the corresponding first and second data streams in order to receive the corresponding first and second messages.

3. The transmitting means of claim 2 wherein the first and second data stream means generate said first and second messages including first and second address signals respectively, each of said first and second address signals matching a predetermined address assigned to the corresponding first and second selective call receivers.

4. The transmitting means of claim 3 wherein said first and second data stream means generate the first and second messages further including first and second information signals, said first and second information signals associated with the first and second address signals, respectively.

5. The transmitting means of claim 1 wherein said first data stream means generates a first portion of a first message intended for reception by a first selective call receiver, the first message having the first portion and a second portion and further wherein said second data stream means generates the second portion to be transmitted on the second data stream in coincidence with the first portion transmitted on the first data stream.

6. The transmitting means of claim 5 wherein the first data stream means generates the first portion comprising an address signal matching a predetermined address assigned to the first selective call receiver, and the second data stream means generates the second portion comprising an information signal associated with the address signal.

7. The transmitting means of claim 5 wherein the common data stream means generates the common data stream comprising a second message intended for reception by a second selective call receiver.

8. The transmitting means of claim 7 wherein the common data stream means generates the common data stream further comprising a synchronization signal for synchronizing said first and second selective call receivers to the corresponding first and second data streams to receive thereafter the corresponding first and second messages.

9. The transmitting means of claim 1 wherein a first message is intended for reception by a first selective call receiver, the first message having an address signal matching a predetermined signal associated with the first selective call receiver and the first message comprising information associated with the address signal, said information including a first portion and a second portion, and wherein the common data stream means generates the common data stream comprising the address signal and the first data stream means generates the first data stream comprising the first portion of said first message and the second data stream means generates the second data stream comprising the second portion of said first message, wherein the modulating means transmits the second portion on the second data stream in coincidence with the first portion being transmitted on the first data stream.

10. The transmitting means of claim 9 wherein the common data stream means generates the common data stream comprising a second message intended for reception by a second selective call receiver.

11. The transmitting means of claim 10 further wherein the common data stream means generates the common data stream comprising a synchronization signal for synchronizing said first and second selective call receivers to the common data stream to receive thereafter the first message on the first, second and common data streams and the second message on the common data stream.

12. The transmitting means of claim 1 wherein a first message having a plurality of binary bits is intended for reception by a first selective call receiver, and a second message is intended for reception by a second selective call receiver wherein said first data stream means generates the first data stream comprising substantially half of the plurality of binary bits of the first message and wherein said second data stream means generates the second data stream comprising the remaining binary bits and wherein the modulating means transmits the remaining binary bits in coincidence with the substantially half of the plurality of binary bits, and further wherein said common data stream means generates the common data stream comprising the second message.

13. The transmitting means of claim 12 wherein said first data stream means generates the first data stream comprising the first bit of the plurality of bits within the first message and wherein said first and second data stream means generate the corresponding first and second data streams comprising the remaining bits, said remaining bits alternating in sequence between the second and first data streams.

14. The transmitting means of claim 12 further wherein said common data stream means generates the common data stream comprising a synchronization signal for synchronizing said first and second selective call receivers to the first and second data streams and the common data stream to thereafter receive the first message on the first and second data streams and the second message on the common data stream, respectively.

15. The transmitting means of claim 12 wherein a third message comprising a plurality of binary bits is intended for reception by a selective call receiver capable of receiving the binary bits on either the common, first or second data stream and wherein said common data stream means generates the common data stream comprising a signal indicative of the common, first or second data stream upon which the third message is to be received and wherein the one of the common, first or second data stream means which generates the respective common, first, or second data stream indicated by the signal generates the corresponding common, first or second data stream comprising the third message.

16. A selective call receiver having a predetermined address and receiving a message transmitted within a plurality of symbols, the message including an address portion and an information portion and each of said plurality of symbols having at least first, second, third and fourth levels, said selective call receiver comprising:

receiving means for receiving and demodulating the plurality of symbols;

digitizing means for generating a plurality of first binary bits and a corresponding plurality of second binary bits in response to the plurality of symbols, the message for said selective call receiver included within the plurality of first and second binary bits, wherein each of the plurality of first binary bits has a first or a second state, one of said plurality of first binary bits having said first state in response to a corresponding one of said plurality of symbols having either the first or second levels and the one of said plurality of first binary bits having said second state in response to the corresponding one of said plurality of symbols having the third or fourth levels, and wherein each of the plurality of second binary bits has a first or a second state, one of said plurality of second binary bits having said first state in response to a corresponding one of said plurality of symbols having either the first or fourth levels and the one of said plurality of second binary bits having said second state in response to the corresponding one of said plurality of symbols having the second or third levels; and decoding means responsive to the plurality of first and second binary bits for receiving and processing the message wherein said decoding means receives the address portion from the first binary bits and simultaneously receives the information portion from the second binary bits.

17. A selective call receiver having a predetermined address and receiving a message transmitted within a plurality of symbols, the message including an address portion and at least first and second information portions, each information portion including independent message signals, and each of said plurality of symbols having at least first, second, third and fourth levels, said selective call receiver comprising:

receiving means for receiving and demodulating the plurality of symbols;

digitizing means for generating a plurality of first binary bits and a corresponding plurality of second binary bits in response to the plurality of symbols, the message for said selective call receiver included within the plurality of first and second binary bits, wherein each of the plurality of first binary bits has a first or a second state, one of said plurality of first binary bits having said first state in response to a corresponding one of said plurality of symbols having either the first or second levels and the one of said plurality of first binary bits having said second state in response to the corresponding one of said plurality of symbols having the third or fourth levels, and wherein each of the plurality of second binary bits has a first or a second state, one of said plurality of second binary bits having said first state in response to a corresponding one of said plurality of symbols having either the first or fourth levels and the one of said plurality of second binary bits having said second state in response to the corresponding one of said plurality of symbols having the second or third levels; and decoding means responsive to the plurality of first and second binary bits for receiving and processing the message wherein said decoding means receives the address portion from the first binary bits, and subsequently receives the first information portion from the first binary bits and simultaneously receives the second information portion from the second binary bits.

18. A selective call receiver having a predetermined address and receiving a message transmitted within a plurality of symbols, each of said plurality of symbols having at least first, second, and third and fourth levels, said selective call receiver comprising:

receiving means for receiving and demodulating the plurality of symbols;

digitizing means for generating a plurality of first binary bits and a corresponding plurality of second binary bits in response to the plurality of symbols, the message for said selective call receiver included within the plurality of first and second binary bits, wherein each of the plurality of first binary bits has a first or a second state, one of said plurality of first binary bits having said first state in response to a corresponding one of said plurality of symbols having either the first or second levels and the one of said plurality of first binary bits having said second state in response to the corresponding one of said plurality of symbols having the third or fourth levels, and wherein each of the plurality of second binary bits has a first or a second state, one of said plurality of second binary bits having said first state in response to a corresponding one of said plurality of symbols having either the first or fourth levels and the one of said plurality of second binary bits having said second state in response to the corresponding one of said plurality of symbols having the second or third levels; and decoding means responsive to the plurality of first and second binary bits for receiving and processing the message wherein the decoding means inhibits processing of the plurality of second binary bits while receiving and processing the plurality of first binary bits in order to decode a control signal.

19. The selective call receiver of claim 18 wherein the control signal includes a synchronization signal and wherein the decoding means synchronizes to the plurality of first binary bits and the plurality of second binary bits in response to the synchronization signal.

20. The selective call receiver of claim 18 wherein in response to the reception of the control signal matching a predetermined control signal, the decoding means inhibits receiving and processing of the plurality of second binary bits and receives and processes the message in response to the plurality of first binary bits.

21. The selective call receiver of claim 18 wherein in response to the reception of the control signal matching a predetermined control signal, the decoding means inhibits receiving and processing of the plurality of first binary bits and receives and processes the message in response to the plurality of second binary bits.

22. The selective call receiver of claim 18 wherein in response to the reception of the control signal matching a predetermined control signal, the decoding means receives and processes the message in response to both the plurality of first binary bits and the plurality of second binary bits.

23. A selective call receiver having a predetermined address and receiving a message transmitted within a plurality of symbols, and each of said plurality of symbols having at least first, second, third and fourth levels, said selective call receiver comprising:

receiving means for receiving and demodulating the plurality of symbols;

digitizing means for generating a plurality of first binary bits and a corresponding plurality of second binary bits in response to the plurality of symbols, the message for said selective call receiver included within the plurality of first and second binary bits, wherein each of the plurality of first binary bits has a first or a second state, one of said plurality of first binary bits having said first state in response to a corresponding one of said plurality of symbols having either the first or second levels and the one of said plurality of first binary bits having said second state in response to the corresponding one of said plurality of symbols having the third or fourth levels, and wherein each of the plurality of second binary bits has a first or a second state, one of said plurality of second binary bits having said first state in response to a corresponding one of said plurality of symbols having either the first or fourth levels and the one of said plurality of second binary bits having said second state in response to the corresponding one of said plurality of symbols having the second or third levels;

memory means for having stored therein a selection signal having a first state representative of a first predetermined value or a second state representative of a second predetermined value; and decoding means responsive to the plurality of first and second binary bits for receiving and processing the message wherein the decoding means inhibits receiving and processing the plurality of second binary bits and receives and processes the plurality of first binary bits in response to the selection signal having the first state.

24. The selective call receiver of claim 23 further wherein the decoding means inhibits receiving and processing the plurality of first binary bits and receives and processes the plurality of second binary bits in response to the selection signal having the second state.

25. A selective call receiver having a predetermined address and receiving a message transmitted within a plurality of symbols, each of said plurality of symbols having at least first, second, third and fourth levels, said selective call receiver comprising:

receiving means for receiving and demodulating the plurality of symbols;

digitizing means for generating a plurality of first binary bits and a corresponding plurality of second binary bits in response to the plurality of symbols, the message for said selective call receiver included within the plurality of first and second binary bits, wherein each of the plurality of first binary bits has a first or a second state, one of said plurality of first binary bits having said first state in response to a corresponding one of said plurality of symbols having either the first or second levels and the one of said plurality of first binary bits having said second state in response to the corresponding one of said plurality of symbols having the third or fourth levels, and wherein each of the plurality of second binary bits has a first or a second state, one of said plurality of second binary bits having said first state in response to a corresponding one of said plurality of symbols having either the first or fourth levels and the one of said plurality of second binary bits having said second state in response to the corresponding one of said plurality of symbols having the second or third levels;

memory means for storing said plurality of second binary bits; and decoding means responsive to the plurality of first and second binary bits for receiving and processing the message wherein the decoding means receives and processes the plurality of first binary bits in order to decode a synchronization signal while receiving the plurality of second binary bits and storing the plurality of second binary bits in said memory means, wherein in response to the reception and decoding of the synchronization signal, the decoding means processes the stored second binary bits in order to decode a control word.

* * * * *